United States Patent
Lee et al.

(10) Patent No.: US 7,835,668 B2
(45) Date of Patent: Nov. 16, 2010

(54) IMAGING METHODS, IMAGING MEMBER CHARGING METHODS, AND IMAGE ENGINES

(75) Inventors: Michael H. Lee, San Jose, CA (US); Omer Gila, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 186 days.

(21) Appl. No.: 10/997,033

(22) Filed: Nov. 24, 2004

(65) Prior Publication Data

US 2006/0110185 A1    May 25, 2006

(51) Int. Cl.
G03G 15/00 (2006.01)
G03G 15/02 (2006.01)
G03G 21/18 (2006.01)

(52) U.S. Cl. .......................... 399/176; 399/26; 399/50; 399/115; 399/116; 399/169

(58) Field of Classification Search .................. 399/26, 399/31, 32, 48, 115, 116, 128, 169, 176
See application file for complete search history.

(56) References Cited

U.S. PATENT DOCUMENTS

| | | | |
|---|---|---|---|
| 4,908,634 A | 3/1990 | Arimoto et al. |
| 5,089,851 A | 2/1992 | Tanaka et al. |
| 5,146,280 A | 9/1992 | Kisu |
| 5,286,586 A | 2/1994 | Foley et al. |
| 5,390,007 A | 2/1995 | Kugoh et al. |
| 5,444,519 A | 8/1995 | Motoyama et al. |
| 5,543,899 A | 8/1996 | Inami et al. |
| 5,596,393 A | 1/1997 | Kobayashi et al. |
| 5,666,608 A | 9/1997 | Christensen |
| 5,678,136 A | 10/1997 | Watanabe et al. |
| 5,751,801 A | 5/1998 | Murata et al. |

(Continued)

FOREIGN PATENT DOCUMENTS

EP    0652492    5/1995

(Continued)

OTHER PUBLICATIONS

Int'l Search Report, Apr. 6, 2006.

(Continued)

*Primary Examiner*—David M Gray
*Assistant Examiner*—Joseph S Wong

(57) ABSTRACT

Imaging methods, imaging member charging methods, and image engines are described. According to one embodiment, an imaging method includes providing an imaging member having an outer surface comprising a plurality of portions having a plurality of different radii, rotating the portions of the outer surface of the imaging member adjacent to a charge device configured to provide an electrical charge to the imaging member which is usable for imaging, first controlling a position of the charge device with respect to one of the portions of the outer surface of the imaging member using the one of the portions of the outer surface at one moment in time, second controlling a position of the charge device with respect to an other of the portions of the outer surface of the imaging member using a positioning control system at an other moment in time, and using the charge device, providing the electrical charge to the one of the portions of the imaging member at the one moment in time.

70 Claims, 5 Drawing Sheets

U.S. PATENT DOCUMENTS

| | | | |
|---|---|---|---|
| 5,765,077 | A | 6/1998 | Sakural et al. |
| 5,805,962 | A | 9/1998 | Ko |
| 5,819,142 | A | 10/1998 | Murata et al. |
| 5,873,019 | A | 2/1999 | Mizuishi |
| 5,956,553 | A | 9/1999 | Park |
| 6,002,899 | A | 12/1999 | Stover et al. |
| 6,014,529 | A | 1/2000 | Sato |
| 6,041,209 | A | 3/2000 | Murata |
| 6,064,841 | A | 5/2000 | Matsuzaki et al. |
| 6,144,819 | A | 11/2000 | Nishiuwatoko |
| 6,269,233 | B1 | 7/2001 | Yamaguchi |
| 6,301,459 | B1 | 10/2001 | Ishiyama et al. |
| 6,311,036 | B1 | 10/2001 | Jia et al. |
| 6,314,259 | B1 | 11/2001 | Chang et al. |
| 6,405,006 | B1 | 6/2002 | Tabuchi |
| 6,405,008 | B1 | 6/2002 | Obu et al. |
| 6,546,219 | B2 | 4/2003 | Sato et al. |
| 6,560,419 | B2 | 5/2003 | Sugiura |
| 6,606,471 | B2 | 8/2003 | Kamei et al. |
| 6,792,232 | B2 | 9/2004 | Suzuki et al. |
| 6,909,859 | B2 | 6/2005 | Nakamura et al. |
| 2001/0033784 | A1 | 10/2001 | Becker et al. |
| 2002/0041776 | A1* | 4/2002 | Tsukida et al. ............... 399/176 |
| 2002/0154922 | A1 | 10/2002 | Ohno et al. |
| 2005/0095035 | A1* | 5/2005 | Vejtasa et al. ............... 399/168 |
| 2005/0129426 | A1* | 6/2005 | Tsunemi et al. ............. 399/159 |

FOREIGN PATENT DOCUMENTS

| | | |
|---|---|---|
| JP | 56091253 | 7/1981 |
| JP | 56104346 | 8/1981 |
| JP | 56 123874 | 9/1981 |
| JP | 56-123874 | 9/1981 |
| JP | 63208877 | 8/1988 |
| JP | 04157485 | 5/1992 |
| JP | 05204228 | 8/1993 |
| JP | 05297681 | 11/1993 |
| JP | 06230648 | 8/1994 |
| JP | 09034329 A * | 2/1997 |
| JP | 11338281 A * | 12/1999 |
| JP | 2003167416 | 6/2003 |
| JP | 2003228225 | 8/2003 |

OTHER PUBLICATIONS

Dictionary Definition of "support"; dictionary.com; printed Jul. 2, 2007; 7 pp.

* cited by examiner

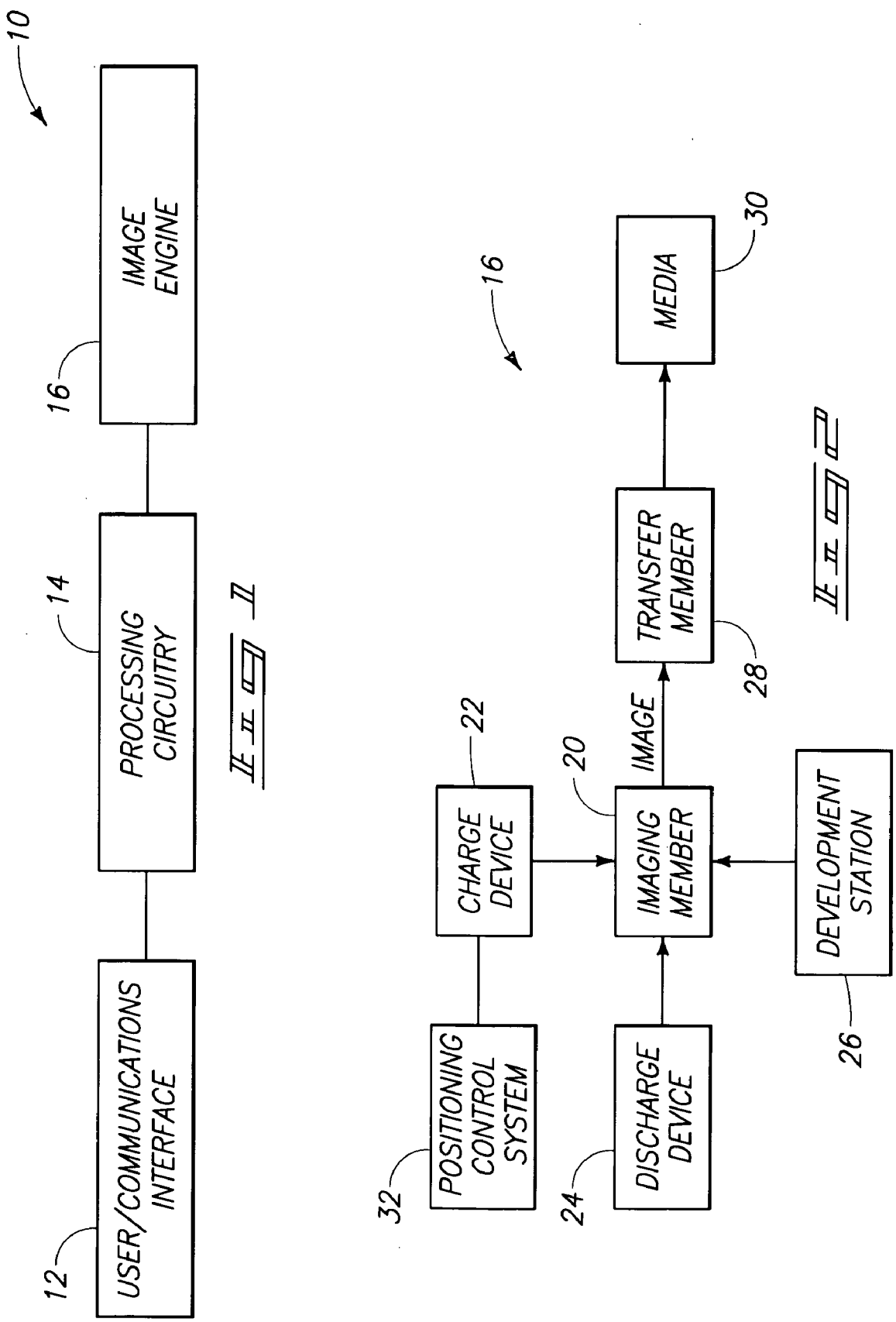

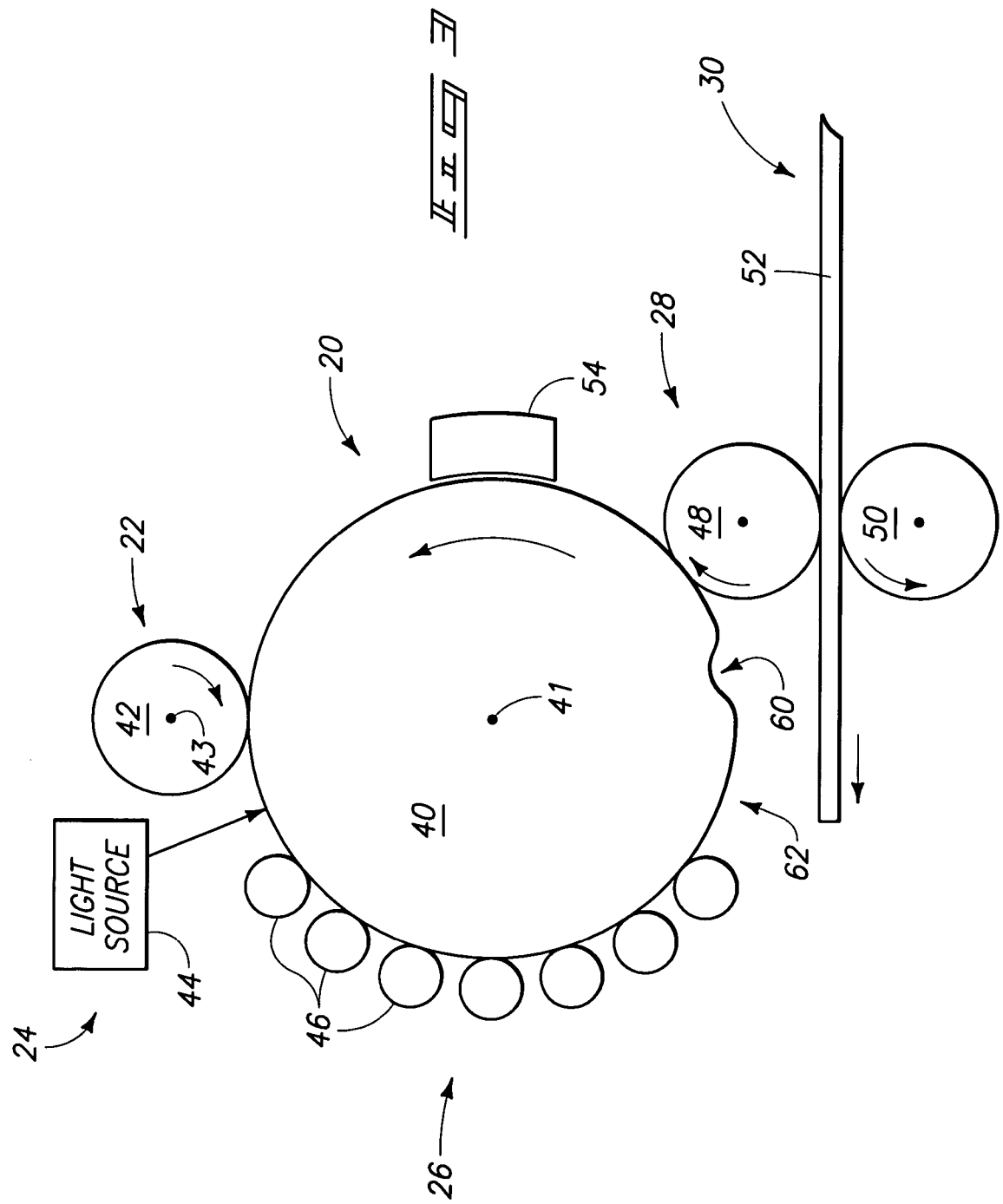

IMAGING METHODS, IMAGING MEMBER CHARGING METHODS, AND IMAGE ENGINES

FIELD OF THE DISCLOSURE

Aspects of the disclosure relate to imaging methods, imaging member charging methods, and image engines.

BACKGROUND OF THE DISCLOSURE

Electrophotographic imaging processes may be implemented in numerous device configurations (e.g., printer, copier, facsimile, etc.) to form hard images upon media, such as paper. An entirety of a photoconductor may be charged by an initial electrical charge, and thereafter selected portions of the photoconductor may be selectively discharged to form a latent image. The latent image may be developed using a marking agent such as toner in a solid process or liquid ink in a liquid process.

In some liquid electrophotographic imaging devices available from Hewlett-Packard Company, the photoconductor may be charged by three sets of double scorotrons to about approximately −1000V. In other configurations, a charge roller has been demonstrated as an alternative means of charging a photoconductor. A single charge roller has been observed to provide adequate electrical charge with the associated benefits of saving space along a surface of the photoconductor as well as a reduction in maintenance.

Some charge rollers are made of a conductive elastomeric material, commonly urethane, molded over a metal core. The charge roller may be lightly pressed against a photoconductor surface to maintain a constant footprint and therefore provide more consistent charging. In some configurations, steady pressure may not be desirable to maintain a constant footprint. For example, some photoconductor configurations have a seam region wherein a photoconductor sheet is inserted into a drum surface and attached. The drum may have a depression in a seam region so that the seam region of the photoconductor does not stick out farther than the radius of the photoconductor and be subject to mechanical damage. However, in a liquid electrophotographic implementation, imaging oil may accumulate within the seam region of the photoconductor. Print defects may result in hard output if a charge roller picks up oil from the seam region and deposits it on other portions of the surface of the photoconductor. In dry electrophotographic processes, potentially damaging electrical arcing may occur if the charge roller enters the seam region of the photoconductor.

Disks or bearers may be attached to opposite sides of a photoconductor drum to provide a convenient reference at a fixed distance from the drum center over the seam. Hard wheels or drivers attached to a shaft of the charge roller may be aligned with the bearers to prohibit the charge roller from dipping into the seam region.

Associated drawbacks exist with the utilization of disks and drivers. For example, the drive diameter is closely matched to a diameter of the charge roller. With a force being applied to the charge roller sufficient to have the drivers ride upon the bearers, the charge roller surface may not maintain an adequately uniform contact patch due to runout of the wheels and the charge roller. If the drivers are too large relative to the charge roller, contact of the charge roller with the photoconductor surface may be intermittent or absent. On the other hand, if the drivers are too small relative to the charge roller, the charge roller may penetrate the seam to a sufficient degree to contact the accumulated imaging oil. In addition, elastomeric material of the charge roller may swell in the presence of imaging oil or moisture to a degree greater than the drivers so that the drivers and the charge roller are out of alignment. Environmental conditions may vary from a desired specification if a imaging device is out of operation for an extended period of time and the time to re-equilibrate the charger roller to a proper diameter may be unacceptably long.

At least some aspects of the disclosure provide improved apparatus and methods for generating hard images.

SUMMARY

According to some aspects, imaging methods, imaging member charging methods, and image engines are described.

According to some aspects, an imaging method comprises providing an imaging member having an outer surface comprising a plurality of portions having a plurality of different radii, rotating the portions of the outer surface of the imaging member adjacent to a charge device configured to provide an electrical charge to the imaging member which -is usable for imaging, first controlling a position of the charge device with respect to one of the portions of the outer surface of the imaging member using the one of the portions of the outer surface at one moment in time, second controlling a position of the charge device with respect to an other of the portions of the outer surface of the imaging member using a positioning control system at an other moment in time, and using the charge device, providing the electrical charge to the one of the portions of the imaging member at the one moment in time.

According to another aspect, an image engine comprises an imaging member comprising an outer surface comprising an imaging region and a seam region, a charge device configured to provide an electrical charge to the imaging region of the outer surface of the imaging member, wherein the outer surface of the imaging member is configured to rotate during imaging operations of the image engine and the charge device is configured to contact the imaging region of the outer surface of the imaging member during the rotation to provide the electrical charge to the imaging region, and a positioning control system configured to space the charge device from the seam region of the outer surface of the imaging member.

Other embodiments and aspects are described as is apparent from the following discussion.

DESCRIPTION OF THE DRAWINGS

FIG. 1 is a functional block diagram of a hard imaging device according to one embodiment.

FIG. 2 is a functional block diagram of an image engine according to one embodiment.

FIG. 3 is an illustrative representation of an image engine according to one embodiment.

DETAILED DESCRIPTION

Figure 5:
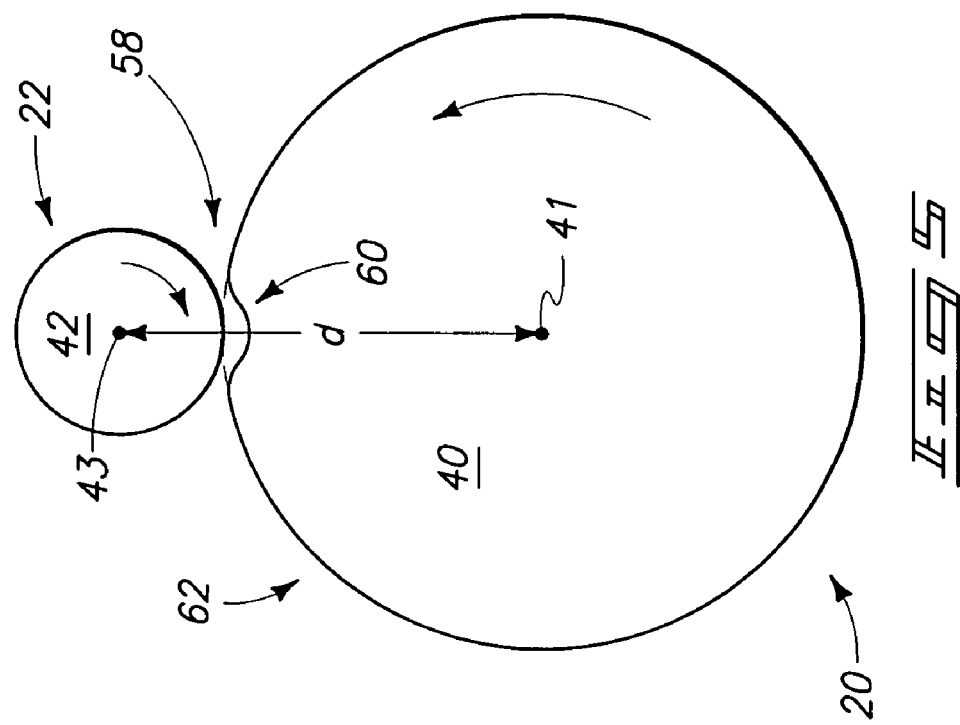
FIG. 5 is another illustrative representation of a charge roller and a photoconductor according to an embodiment.

Referring initially to FIG. 1, an exemplary hard image device 10 is shown. Hard imaging device 10 is configured to form hard images upon output media, such as paper. In one embodiment, device 10 may be implemented as an electrophotographic press configured to print numerous hard images upon media at relative fast rates for extended periods of time (e.g., tens of thousands of sheets of media imaged per day). Other electrophotographic configurations or implementations of device 10 are possible including laser printers, copiers, facsimile devices, or other arrangements configured to form hard images upon media.

The depicted exemplary hard imaging device 10 includes a user/communications interface 12, processing circuitry 14, and an image engine 16. Additional components may be utilized to provide generation of hard images (e.g., media handling equipment, storage circuitry or memory configured to store image data, software, firmware, or other programming, etc.).

User/communications interface 12 is configured to interact with a user and/or implement external communications with respect to device 10. For example, interface 12 may include an input device such as a keyboard as well as a display (e.g., graphical user interface). Interface 12 may include an electrical interface such as a network interface card (NIC) in one embodiment to implement electrical data communications (input and/or output) externally of device 10.

Processing circuitry 14 is configured to process received user input, process image data, implement external communications, monitor imaging operations of device 10 and/or control imaging operations of device 10. Processing circuitry 14 may comprise circuitry configured to implement desired programming provided by appropriate media (e.g., hard disk, memory, etc.) in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

Image engine 16 is configured to form hard images upon media. For example, processing circuitry 14 may perform image processing operations upon data (e.g., rasterization) and provide the image data to image engine 16 for hard imaging upon media. An exemplary image engine 16 is configured to generate hard images upon media according to the received image data.

Referring to FIGS. 2-3, details regarding an exemplary configuration of image engine 16 configured to implement electrophotographic imaging operations according to one embodiment are shown. The depicted image engine includes an imaging member 20, a charge device 22, a discharge device 24, a development station 26, a transfer member 28, and a positioning control system 32. Other configurations are possible include more, less or alternative components.

Imaging member 20 may comprise an outer surface with plural portions or regions of different radii. For example, imaging member 20 may comprise a photoconductor embodied as a drum 40 (FIG. 3) having a photoconductor sheet as the outer surface wherein the ends may be provided adjacent to one another at a seam region 60. As described below, the outer surface may have a radius smaller at seam region 60 compared with an imaging region 62 of the outer surface. The illustrated seam region 60 is provided to depict aspects of the disclosure and the seam region 60 may be smaller or larger in actual implementations. Imaging region 62 may refer to portions of the outer surface wherein images are formed and developed as described further below (e.g., in one embodiment imaging region 62 may comprise the remaining portions of the outer surface apart from seam region 60).

The imaging member 20 may rotate about an axis 41 in a counterclockwise direction in the exemplary described photoconductor drum embodiment wherein portions of the outer surface pass adjacent to charge device 22, discharge device 24, development station 26 and transfer member 28. Other configurations of imaging member 20 (e.g., a photoconductor belt) are possible in other embodiments.

Charge device 22 is embodied as a charge roller 42 in the described exemplary embodiment shown in FIG. 3. Charge device 22 is configured to provide an electrical charge of approximately −1000 V to the imaging region 62 of imaging member 20 in one arrangement. In one embodiment, charge roller 42 is configured to rotate about axis 43 and ride upon imaging region 62 of imaging member 20 to provide the electrical charge to imaging region 62. In other embodiments, charge roller 42 contacts imaging region 62 to charge region 62 without use of gravity (e.g., another bias force such as a spring may or may not be used), or charge roller 42 is spaced (e.g., using spacer rings) from but proximately located adjacent to imaging region 62 to effect charging of imaging region 62. Other configurations may be provided to implement charging of imaging region 62 by charge roller 42.

Discharge device 24 is configured to discharge the electrical charge on the imaging member 20 at selected locations corresponding to a desired image to be formed. The discharging of the electrical charge provides a latent image upon the imaging region 62 of the imaging member 20. In one embodiment, discharge device 24 may be implemented as a light source 44 (FIG. 3) such as a laser.

Development station 26 is configured to provide a marking agent, such as dry toner in a dry configuration or liquid ink in a liquid configuration. The marking agent may be electrically charged and attracted to the discharged locations of the imaging region 62 of the imaging member 20 corresponding to the latent image to develop the latent image. Development station 26 may include a plurality of development rollers 46 (FIG. 3) which may provide marking agents of different colors to develop the latent images in one embodiment.

The marking agent of the developed image formed upon the imaging region 62 of the imaging member 20 may be transferred to media 30 such as paper 52 using a transfer member 28. In one embodiment, transfer member 28 is configured as a transfer drum 48 (FIG. 3). An impression drum 50 may define a nip with transfer drum 48 to transfer the developed image to paper 52 in the embodiment of FIG. 3.

A cleaning station 54 shown in FIG. 3 may be provided to remove any marking agent which was not transferred from imaging region 62 to transfer drum 48 prior to recharging by charge roller 42. In one embodiment, cleaning station 54 may apply imaging oil to the surface of imaging member 20 to assist with the removal of marking agent from the surface which was not transferred using transfer member 28. However, some residual imaging oil may remain within the seam region 60 which may result in imaging defects if contacted by charge device 22.

According to at least some aspects of the disclosure, positioning control system 32 (FIG. 2) is configured to control a position of one or both of charge device 22 and imaging member 20 relative to the other. As discussed further below, the positioning control system 32 may be configured to implement operations to control the position corresponding to positioning of regions or portions of the outer surface of imaging member 20. For example, positioning control system 32 may operate to space charge device 22 from a seam region 60 of imaging member 20 in exemplary embodiments some of which are discussed further below.

Figure 4:
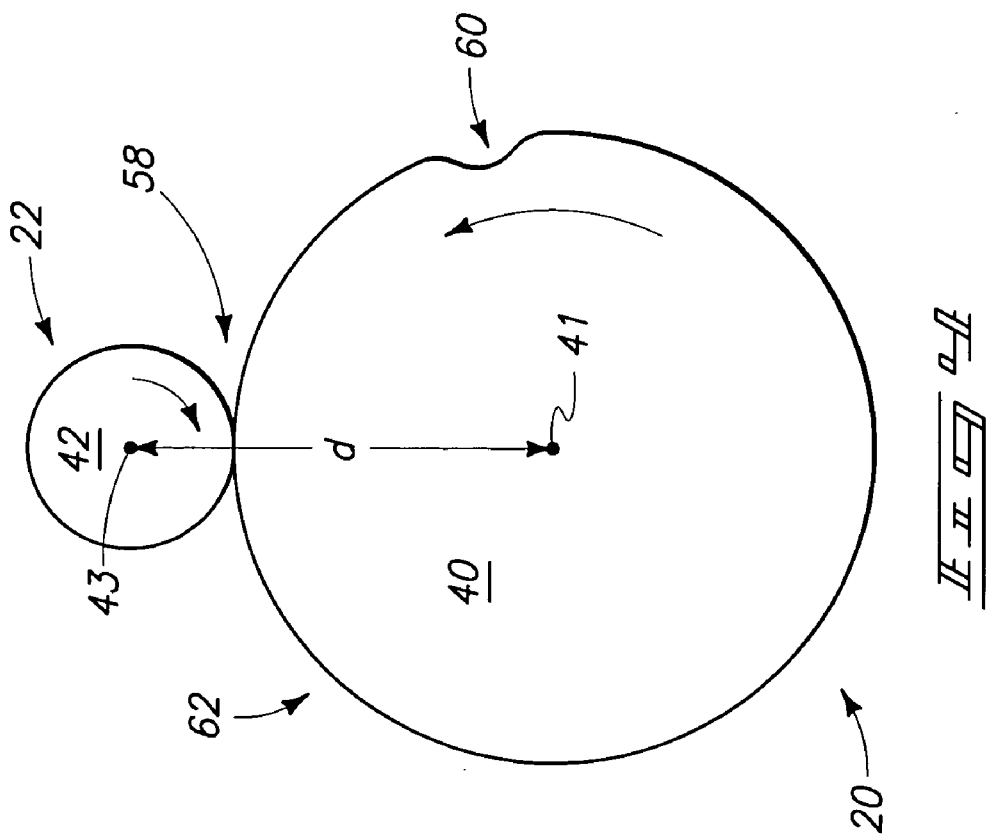
FIG. 4 is an illustrative representation of a charge roller and a photoconductor according to an embodiment.

Referring to FIGS. 4 and 5, exemplary details are described with respect to control of the positional relationship of imaging member 20 and charge device 22 according to one embodiment. In the embodiment of FIGS. 4 and 5, charge device 22 is configured to ride upon and rotate with imaging region 62 of imaging member 20 as shown in FIG. 4 and to be provided in a spaced relationship with respect to seam region 60 as shown in FIG. 5.

For example, charge device 22 may be oriented elevationally above imaging member 20 in one embodiment. In at least one arrangement, axis 43 of charge device 22 is located directly over axis 41 of imaging member 20 (e.g., in a direction normal to a surface of imaging member 20 at nip location 58). Further in accordance with an exemplary embodiment, the position of axis 41 of imaging member 20 may be fixed while charge device 22 may be configured to move in a substantially vertical direction as illustrated and described below. In other embodiments, axis 43 may be fixed and axis 41 may be configured to move or both axes 41, 43 may move.

According to the embodiment of FIGS. 4 and 5 wherein axis 41 is the only fixed axis, gravity may impart a gravitational force upon charge device 22 to urge charge device 22 against imaging member 20. In some embodiments, the diameter of one or both of imaging member 20 and charge device 22 may vary slightly over time, and arranging imaging member 20 and charge device 22 as shown (e.g., wherein axis 43 of charge device 22 may move) maintains contact between charge device 22 and imaging region 62 of imaging member 20 in at least one embodiment (i.e., gravity may move charge device 22 downward to contact member 20 if the diameter of one or more of imaging member 20 or charge device 22 becomes smaller). Also, charge device 22 may be raised upward if the diameter of one or both of member 20 or device 22 increases. Imaging member 20 and charge device 22 may form a nip at a nip location 58 shown in FIGS. 4 and 5 wherein charging of imaging region 62 at nip location 58 occurs.

Figure 6:
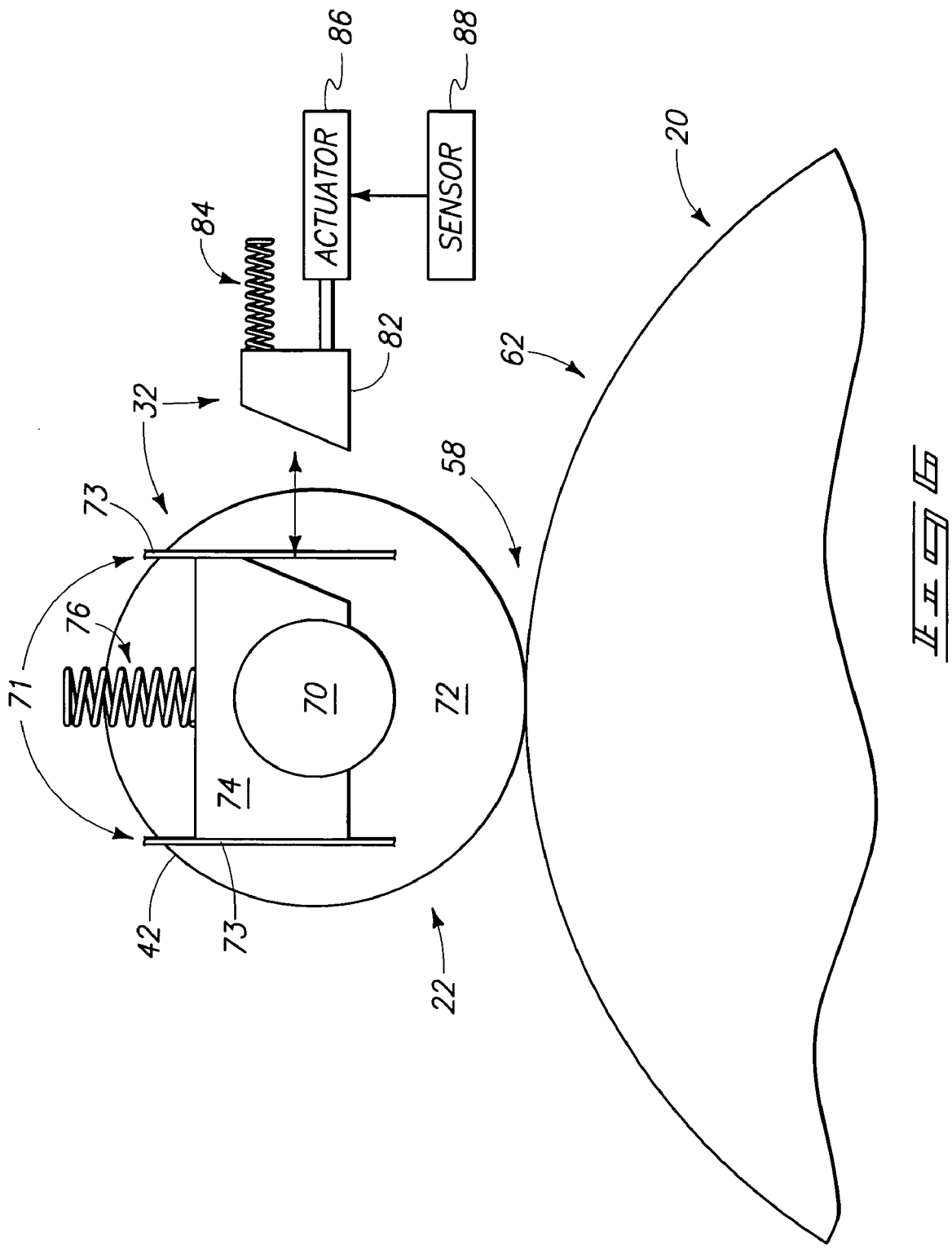
FIG. 6 is an illustrative representation of a positioning control system according to one embodiment.

In other embodiments, axes 41, 43 may be offset with respect to another. In one operable example, axis 42 may be positioned approximately fifteen degrees off vertical. If axis 42 is positioned elevationally over axis 41 (on or off vertical), then gravitational force acting as a bias force may urge charge device 22 to contact imaging region 62 of imaging member 20. As shown in the example of FIG. 6, an additional bias force may be provided, such as by spring 76. In some embodiments (e.g., axes 41, 43 are aligned horizontally), gravity may not operate to urge contact between charge device 22 and imaging region 62. A sufficient bias force may be provided (e.g., by a spring in one embodiment) to provide contact between charge device 22 and imaging region 62 in one example.

In some arrangements, it is beneficial to reduce or avoid entry of charge device 22 into seam region 60 of imaging member 20. For example, a charge device 22 may contact accumulated imaging oil left from the cleaning step within the seam region 60 which may result in imaging defects or otherwise degrade imaging quality and/or increase the chances of arcing between the charge roller and a ground plane of the photoconductor. Accordingly, in some embodiments, positioning control system 32 of FIG. 2 may be utilized to reduce or avoid entry of charge device 22 into seam region 60 to reduce or avoid residual imaging oil in region 62 being transferred to charge device 22. In one implementation, positioning control device 32 may be utilized to maintain a substantially constant distance "d" intermediate axes 41, 43 during rotations of imaging member 20 and charge device 22 including moments in time wherein charging device 22 rides upon imaging region 62 as well as moments of time when seam region 60 is present at nip location 58.

Distance "d" may vary over time (e.g., slightly) corresponding to fluctuations in diameter of one or both of imaging member 20 and charge device 22. Accordingly, the substantially constant distance refers to temporally related moments in time for example during imaging of one or more temporally related imaging jobs and is not intended to refer to the life of hard imaging device 10 in at least one embodiment.

Referring to FIG. 6, exemplary operations of a first embodiment of positioning control system 32 are described. Positioning control system 32 includes a support member 82, bias spring 84, actuator 86 and sensor 88 in the exemplary arrangement.

FIG. 6 illustrates charge device 22 comprising charge roller 42 including a shaft 70 and outer surface layer 72 such as elastomeric material (e.g., urethane) molded over shaft 70 comprising a metal core in one embodiment. A bearing block or holder 74 is coupled with a bias spring 76 configured in conjunction with a gravitational force to urge shaft 70 (and charge device 22) downward toward imaging member 20. A support member (e.g., housing wall, bracket, or other suitable structure configured to hold bearing block 74 relative to a housing of hard imaging device 10) may include a guide 71 comprising walls 73 configured to restrict movement of shaft 70, block 74, and charge device 22 to a generally upward and downward direction (e.g., in a direction normal to a surface of imaging member 20) in one embodiment. The right guide wall 73 may include an opening (not shown) to permit support member 82 to pass therethrough to engage block 74. The opening and support member 82 have respective widths less than the width of block 74 (in a direction parallel to axis 43) in one embodiment.

In the illustrated embodiment, sensor 88 is configured to monitor rotation of imaging member 20. For example, sensor 88 may provide a signal which indicates seam region 60 (not shown in FIG. 6) approaching nip location 58. The signal may control actuator 86 to move support member 82 (e.g., a wedge in the depicted embodiment) in a horizontal direction towards bearing block 74 to engage block 74. Accordingly, in one embodiment, the system 32 may control the position of charge device 22 (i.e., supporting charge device 22 using support member 82) responsive to seam region 60 approaching nip location 58. In another embodiment, sensor 88 may provide a signal to processing circuitry 14 which is configured to control operations of actuator 82.

The assertion of a force by actuator 86 upon support member 82 and bearing block 74 operates in conjunction with friction between block 74 and the left wall 73 of guide 71 to restrict downward movement of charge device 22 into seam region 60 to avoid accumulated imaging oil of the seam region 60 from contacting charging device 22. Following rotation of seam region 60 sufficiently away from nip location 58, actuator 86 may be deactivated and charge device 22 may again ride upon imaging member 20.

Accordingly, in one embodiment, a position of charge device 22 with respect to an outer surface of imaging member 20 is controlled by imaging portion or region 62 at one moment in time (i.e., imaging region 62 being within nip location 58) and by positioning control system 32 at another moment in time (i.e., seam region 60 being within nip location 58). In one embodiment, the position of axis 43 and charge device 22 is substantially the same during full rotations of imaging member 20 and charge device 22. It may be desired to reduce upward movement of device 22 during actuation and/or deactuation of actuator 86 to reduce image defects.

In one embodiment, bearing block 74 and support member 82 may have matching angled surfaces. The angle of support member 82 may be provided as shown to enable the usage of reduced force from actuator 86 to provide charge device 22 at a desired position. For example, in other embodiments, support member 82 may have a vertical engaging surface and an increased force from actuator 86 may be used to maintain charge device 22 at a desired position.

Also, with the provision of an angled wedge surface of member 82 as shown and the removal of the force from actuator 86 (i.e., after passage of seam region 60 out of nip location 58), the weight of charge device 22 may be sufficient to move wedge 74 to an unactuated position (e.g., displacing support member 82) accommodating changes in diameter of imaging member 20 and/or charge device 22 wherein device 22 rides upon imaging region 62. The exemplary embodiment provides adjustment of the charge device 22 position over regions of the outer surface of member 20 on every rotation of imaging member 20.

In one embodiment, an engaging surface of support member 82 has an angle of approximately 15 degrees relative to vertical. In some embodiments, the angle relative to vertical may be in the range of 0 to 45 degrees (15 to 30 degrees being preferred in one embodiment). The angle should not be made too large (e.g., >45 degrees) in some configurations or the actuation of actuator 86 may result in charge device 22 being subjected to upward forces from support member 82 upon activation which may result in print or imaging defects, and/or charge device 22 may not sufficiently displace support member 82 upon deactivation of actuator 86 if support member 82 was moved upon activation of actuator 86.

The illustrated distance between support member 82 and bearing block 74 is exaggerated according to at least one embodiment to conveniently illustrate details of the depicted exemplary positioning control system 30. In at least one embodiment, spring 84 provides a force to bias support member 82 to contact bearing block 74 (in the absence of force from actuator 86) but without sufficient force to prevent gravity from moving charging device 22 downward to contact imaging region 62 or seam region 60. The provision of the bias force by spring 84 reduces the presence of imaging defects which may be otherwise caused by the impulse imparted by support member 82 being forced against bearing block 74 upon actuation of actuator 86 if block 74 and member 82 are separated during previous deactivation of actuator 86.

Actuator 86 may be implemented as an air cylinder or solenoid in exemplary embodiments. An air cylinder provides the advantages of providing actuated force in plural opposing directions while a solenoid typically provides actuated force in a single direction. An exemplary solenoid is a 1"×0.5" Ledex Model 195203-231 which may adequately support charge device 22 using a support member 82 having an angled surface of 15 degrees relative to vertical without usage of bias spring 84.

Figure 7:
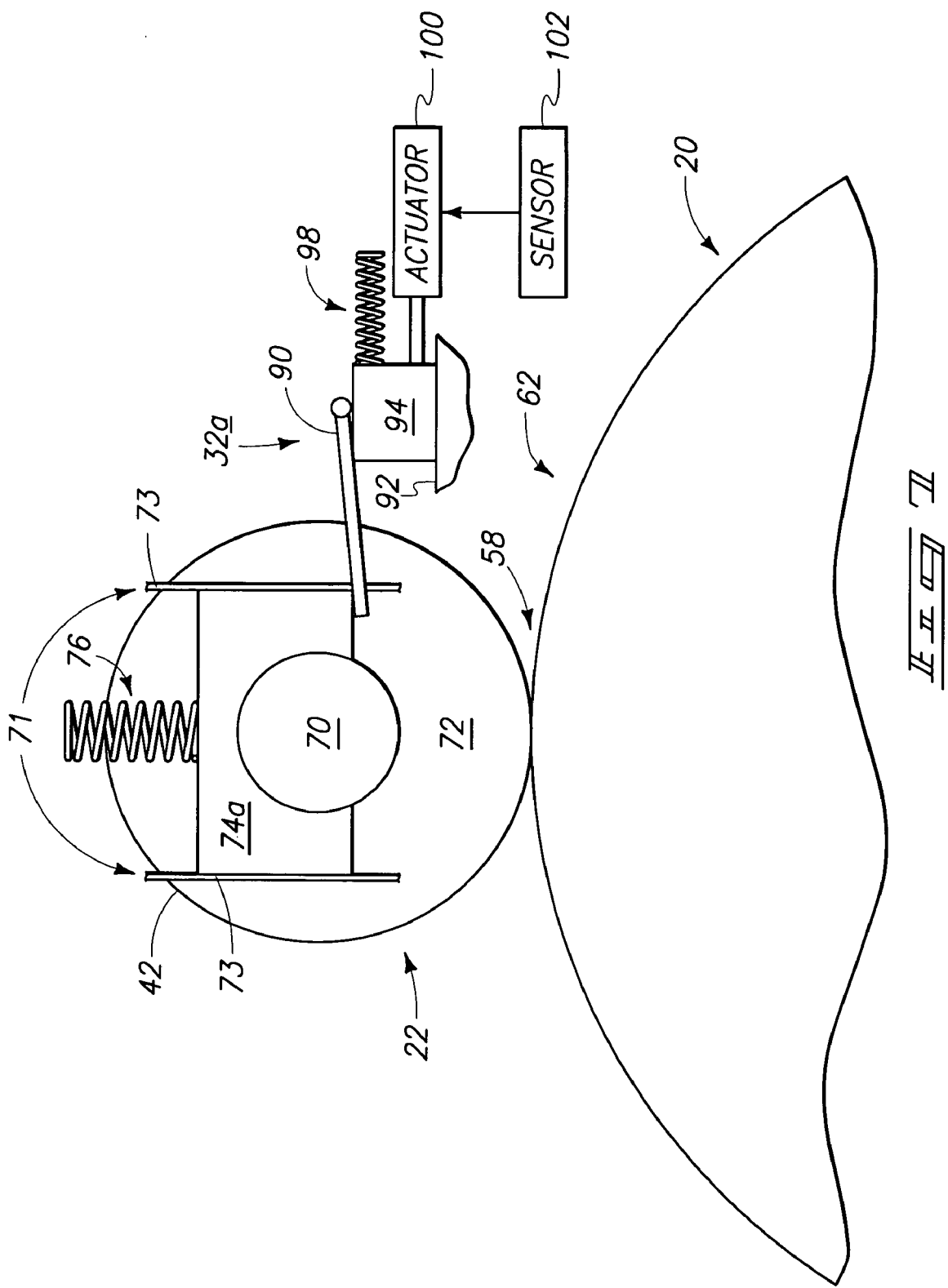
FIG. 7 is another illustrative representation of a positioning control system according to one embodiment.

Referring to FIG. 7, another embodiment of a positioning control system is depicted with respect to reference 32a. Positioning control system 32a includes a support member 90, a support having a surface 92, a slide 94, a spring 98, actuator 100 and sensor 102. In the illustrated embodiment, one end of support member 90 may be configured to pass through an opening (not shown) of the right wall 73 to support bearing block 74a similar to the operation of the system 32 of FIG. 6. The opposite end of the support member 90 is configured to rotate about a pin which is provided at a fixed location in one embodiment (e.g., affixed to a housing of the device 10). Spring 98 is configured to bias slide 94 upon support surface 92 towards support member 90 (e.g., support surface 92 may also comprise a portion of or be affixed to a housing of device 10 or otherwise provided in a fixed location). In another embodiment, surface 92 may be omitted and actuator 100 may support slide 94.

Actuator 100 may be provided to implement calibration operations (e.g., to accommodate changes in diameter of imaging member 20 and/or charge device 22). For example, during normal operations, an initial calibration operation may be performed wherein actuator 100 draws the slide 94 to the right to provide a space between the slide 94 and support member 90 while device 22 rests upon imaging region 62 which may be idle. Thereafter, the actuator 100 is deactivated and spring 98 exerts a force to move slide 94 to the left to engage and support the support member 90 during hard imaging operations. During imaging, and if the angle of support member 90 is sufficiently small relative to horizontal, then the slide 94 remains biased in the same calibrated location by spring 98 (and without force from actuator 100 in one embodiment). Even gravitational forces acting upon the charge device 22 during the presence of seam region 60 below charge device 22 will not overcome friction to move the slide 94. An operational angular range of support member 90 relative to horizontal includes 5 to 45 degrees in one embodiment with a preferred range of 10 to 15 degrees in an implementation.

At subsequent moments in time after a number of hard images have been formed (e.g., thousands), it may be desired to recalibrate the positioning control system 32a to accommodate for any changes in diameter of imaging member 20 and/or charge device 22. Actuator 100 may be activated to move slide to the right away from and spaced from support member 90 while device 22 rests upon imaging region 62 which may be idle or moving. Thereafter, actuator 100 may be deactivated and spring 98 may again bias slide 94 leftward towards support member 90 to support and hold bearing block 74a at a substantially fixed elevation until a subsequent calibration operation is performed in at least one embodiment. During exemplary calibrations, slide 94 engages support member 90 at positions further to the right if a diameter of charge device 22 decreases. If the diameter of charge device 22 increases, spring 98 may urge slide 94 to the left as shown in FIG. 7. The embodiment of positioning control system 32a of FIG. 7 has the advantages of reduced movement of parts during imaging operations resulting in reduced wear.

In one embodiment, it may be desired to perform the calibration operations with charge device 22 resting upon imaging region 62 of imaging member 20 as mentioned above to provide correct positioning during imaging operations. Accordingly, sensor 102 may be utilized to detect moments when of charge device 22 is supported by imaging member 20 and wherein calibration may be performed. In some embodiments, rotation of imaging member 20 may remain the same speed as during imaging, be slowed or stopped during calibration operations.

Referring again to FIG. 6, the angled surface of support member 82 may have an angle relative to vertical greater than 45 degrees in some arrangements whereupon the weight of charge device 22 may not be sufficient to displace support member 82 (similar to the exemplary embodiment of FIG. 7). In one exemplary arrangement, control of actuator 86 to support charge device 22 above the seam region 60 may be omitted in at least one embodiment because the weight of charge device 22 may not be sufficient to displace the slide 94 when the charge device 22 is over the seam region 60. Calibration operations of the above-described embodiment of FIG. 6 may be implemented similar to the calibration of the embodiment of FIG. 7.

At least some of the embodiments described herein are configured to provide or control operational positional relationships of imaging member 20 and charge device 22 with respect to one another even during the presence of changes in diameter of member 20 and/or device 22. According to at least some of the described aspects, the charge device 22 position is controlled by positioning control system 32, 32a when seam region 60 is within nip location 58. At other moments in time, charge device 22 rides upon imaging region 62 and imaging member 20 operates to control the position of charge device 22. The exemplary embodiments described herein provided greater flexibility for accommodating changes in diameter of imaging member 20 and/or charge device 22 which may vary due to manufacturing tolerances, environmental conditions, usage, or other factors.

The protection sought is not to be limited to the disclosed embodiments, which are given by way of example only, but instead is to be limited only by the scope of the appended claims.

What is claimed is:

1. An imaging method comprising:
providing an imaging member having an outer surface comprising a plurality of portions having a plurality of different radii;
rotating the portions of the outer surface of the imaging member adjacent to a charge device configured to provide an electrical charge to the imaging member, the charge device comprising only a single charge emitting structure for emitting an entirety of the energy which is used to charge the imaging member;
first controlling a position of the charge device with respect to a first one of the portions of the outer surface of the imaging member using the first one of the portions of the outer surface at a first moment in time;
second controlling a position of the charge device with respect to a second one of the portions of the outer surface of the imaging member using a positioning control system at a second moment in time;
using the charge device, providing the electrical charge to the one of the portions of the imaging member at the one moment in time; and
detecting a position of the second one of the portions of the outer surface of the imaging member approaching a location of the charge device, and wherein the second controlling comprises activating the positioning control system responsive to the detecting.

2. The method of claim 1 wherein the first controlling comprises controlling the position of the charge device to contact the first one of the portions of the outer surface comprising an imaging region and the second controlling comprises controlling the position of the charge device to be spaced from the the second one of the portions of the outer surface comprising a seam region.

3. The method of claim 2 wherein the imaging member comprises a photoconductive sheet, and the seam region corresponds to a seam of the photoconductive sheet.

4. The method of claim 1 wherein the charge device contacts the first one of the portions of the outer surface at the first moment in time and the charge device is spaced from the second one of the portions of the outer surface at the second moment in time.

5. The method of claim 1 wherein the providing the imaging member comprises providing the imaging member and the charge device in an arrangement wherein a force urges one of the imaging member and the charge device against the other of the imaging member and the charge device.

6. The method of claim 1 further comprising utilizing a force to cause the charge device to contact the first one of the portions of the outer surface at the first moment in time.

7. The method of claim 6 wherein the force is provided by a spring.

8. The method of claim 6 wherein the force comprises a gravitational force.

9. The method of claim 1 further comprising:
aligning the charge device elevationally above the imaging member; and
forcing the charge device to contact the first one of the portions of the outer surface of the imaging member using gravitational force.

10. The method of claim 9 wherein the radius of the second one of the portions of the outer surface is less than the radius of the first one of the portions of the outer surface, and the second controlling comprises supporting the charge device using the positioning control system at the second moment in time to prevent contacting of the charge device and the second one of the portions of the outer surface.

11. The method of claim 1 further comprising:
forming a latent image upon the first one of the portions of the outer surface of the imaging member; and
developing the latent image using a marking agent.

12. The method of claim 11 wherein the marking agent comprises a liquid marking agent.

13. The method of claim 1 wherein the imaging member and the charge device individually comprise a drum, and further comprising maintaining a substantially constant distance between respective axes of the imaging member and the charge device at the first and second moments in time.

14. The method of claim 1 wherein the providing the imaging member comprises providing a photoconductor drum.

15. The method of claim 1 wherein the single charge emitting structure provides an entirety of a blanket electrical charge which is provided to the imaging member during imaging.

16. An imaging member charging method comprising:
providing an imaging member having an imaging region and a seam region;
providing a charge device elevationally above the imaging member;
using a gravitational force, contacting the charge device with an imaging region of an outer surface of the imaging member at one moment in time;
providing an electrical charge to the imaging region of the imaging member using the charge device during the contacting; and
providing a space intermediate the charge device and the seam region at an other moment in time.

17. The method of claim 16 further comprising supporting the charge device using the outer surface of the imaging member at the one moment in time.

18. The method of claim 16 wherein the imaging region and the seam region have different radii.

19. The method of claim 16 wherein the imaging region has a radius larger than a radius of the seam region.

20. The method of claim 19 wherein the imaging member and the charge device individually comprise a drum, and wherein the providing the space comprises maintaining a substantially constant distance between respective axes of the imaging member and the charge device.

21. The method of claim 16 wherein the providing the space comprises supporting the charge device in a spaced relationship from the seam region of the imaging member at the other moment in time.

22. The method of claim 16 wherein the providing the space comprises supporting the charge device using a slide.

23. The method of claim 16 further comprising supporting the charge device using the imaging region of the outer surface of the imaging member at the one moment in time.

24. An imaging member charging method comprising:
providing an imaging member having an imaging region and a seam region;
providing a charge device elevationally above the imaging member;
using a gravitational force, contacting the charge device with an imaging region of an outer surface of the imaging member at one moment in time;
providing an electrical charge to the imaging region of the imaging member using the charge device during the contacting;
providing a space intermediate the charge device and the seam region at an other moment in time;
rotating the imaging member and the charge device;
detecting the seam region approaching a nip of the imaging member and the charge device; and
actuating a force to provide the space responsive to the detecting.

25. The method of claim 24 wherein the actuating comprises actuating the force to support a holder of the charge device using a support member.

26. The method of claim 25 further comprising biasing the support member to contact the holder in the absence of the actuated force.

27. The method of claim 24 wherein the actuating the force comprises applying a force to a wedge and further comprising supporting the charge device using the wedge.

28. An image engine comprising:
an imaging member comprising an outer surface comprising an imaging region and a seam region;
a charge device configured to provide an electrical charge to the imaging region of the outer surface of the imaging member, wherein the outer surface of the imaging member is configured to rotate during imaging operations of the image engine and the charge device is configured to contact the imaging region of the outer surface of the imaging member during the rotation to provide the electrical charge to the imaging region;
a positioning control system including a sensor configured to detect the seam region approaching a location of the charge device and an actuator to space the charge device from the seam region of the outer surface of the imaging member when the seam region approaching the location is detected by the sensor; and
wherein the charge device is supported by the imaging region of the imaging member.

29. The engine of claim 28 wherein the imaging member and charge device are arranged in a configuration wherein a bias force presses the charge device against the imaging region of the imaging member.

30. The engine of claim 28 wherein the imaging member comprises a photoconductor drum and the outer surface has different radii corresponding to the imaging region and seam region, and the charge device comprises a charge roller.

31. The engine of claim 30 wherein the imaging member and charge device are configured to rotate about respective axes and the positioning control system is configured to provide a substantially constant distance between the axes during complete rotations of the imaging member and the charge device.

32. The engine of claim 28 further comprising:
a discharge device configured to electrically discharge selected portions of the electrically charged imaging region to form a latent image; and
a development station configured to develop the latent image of the imaging region using a liquid marking agent.

33. The engine of claim 28 wherein the imaging member is configured to support weight of the charge device.

34. An imaging engine comprising:
an imaging member comprising an outer surface comprising an imaging region and a seam region;
a charge device configured to provide an electrical charge to the imaging region of the outer surface of the imaging member, wherein the outer surface of the imaging member is configured to rotate during imaging operations of the image engine and the charge device is configured to contact the imaging region of the outer surface of the imaging member during the rotation to provide the electrical charge to the imaging region;
a positioning control system configured to space the charge device from the seam region of the outer surface of the imaging member;
wherein the charge device is supported by the imaging region of the imaging member;
wherein the charge device is configured to ride upon the imaging region of the outer surface of the imaging member at a nip location corresponding to a location of a nip defined by the imaging member and the charge device, and the positioning control system is configured to space the charge device from the seam region when the seam region is located at the nip location;
wherein the positioning control system is configured to support the charge device during the presence of the seam region in the nip location; and
wherein the positioning control system comprises a sensor configured to detect the seam region approaching the nip location and an actuator coupled with the sensor and configured to actuate a force to support the charge device during the presence of the seam region in the nip location.

35. An image engine comprising:
a charge device;
an imaging member comprising an outer surface including an imaging region and a seam region;
wherein the charge device is positioned adjacent to the imaging member and is configured to form a nip with the imaging region of the outer surface of the imaging member at a nip location to provide an electrical charge to the imaging region and which is usable to form a latent image;
a positioning control system including a sensor configured to detect the seam region being positioned substantially at the nip location, and an actuator configured to space the charge device apart from the seam region of the outer surface of the imaging member when sensor detects the seam region is positioned substantially at the nip location; and
wherein the charge device and the imaging member are configured in an arrangement wherein a bias force presses the charge device against the imaging region of the imaging member.

36. The engine of claim 35 wherein the charge device is configured to contact the imaging region of the outer surface of the imaging member.

37. The engine of claim 35 wherein the charge device is positioned elevationally above the imaging member.

38. The engine of claim 37 wherein the charge device is configured to ride upon the imaging member.

39. The engine of claim 38 wherein the imaging member comprises a photoconductor drum and the outer surface has different radii corresponding to the imaging region and seam region.

40. The engine of claim 39 wherein the imaging member and charge device are configured to rotate about respective axes spaced from one another at a given distance during contact of the charge device and the imaging region and the positioning control system is configured to substantially maintain the given distance between the axes when the seam region is positioned at the nip location.

41. The engine of claim 39 wherein the positioning control system is configured to prevent the bias force from pressing the charge device against the seam region.

42. The engine of claim 35 further comprising:
   a discharge device configured to electrically discharge selected portions of the electrically charged imaging region to form the latent image; and
   a development station configured to develop the latent image of the imaging region using a liquid marking agent.

43. The engine of claim 35 wherein the bias force comprises a gravitational force.

44. The engine of claim 35 further comprising a member configured to provide the bias force to press the charge device against the imaging region of the imaging member.

45. The engine of claim 35 wherein the charge device comprises only a single charge emitting structure which is configured to emit an entirety of the energy which is used to charge the imaging member.

46. The engine of claim 45 wherein the single charge emitting structure provides an entirety of a blanket electrical charge which is provided to the imaging member during imaging.

47. The engine of claim 45 wherein the single charge emitting structure is configured to charge all portions of an outer surface of the imaging member.

48. The engine of claim 45 wherein the single charge emitting structure comprises only a single continuous charge emitting surface which is configured to emit the entirety of the energy which is used to charge the imaging member.

49. The engine of claim 45 wherein the image engine is configured such that only the energy emitted from the single charge emitting structure charges the imaging member.

50. The engine of claim 45 wherein the imaging member is configured such that only the energy emitted from the single charge emitting structure charges the imaging member.

51. The engine of claim 35 wherein the charge device is configured to permit the bias force to press the charge device against the imaging region.

52. The engine of claim 35 wherein the charge device is configured to permit the bias force comprising a gravitational force to press the charge device against the imaging region.

53. An image engine comprising:
   an imaging member comprising an outer surface comprising an imaging region and a seam region;
   a charge device configured to provide an electrical charge to the imaging region of the outer surface of the imaging member, wherein the outer surface of the imaging member is configured to rotate during imaging operations of the image engine and the charge device is configured to contact the imaging region of the outer surface of the imaging member during the rotation to provide the electrical charge to the imaging region;
   a positioning control system configured to space the charge device from the seam region of the outer surface of the imaging member;
   wherein the charge device is configured to ride upon the imaging region of the outer surface of the imaging member at a nip location corresponding to a location of a nip defined by the imaging member and the charge device, and the positioning control system is configured to space the charge device from the seam region when the seam region is located at the nip location;
   wherein the positioning control system is configured to support the charge device during the presence of the seam region in the nip location; and
   wherein the positioning control system comprises a sensor configured to detect the seam region approaching the nip location and an actuator coupled with the sensor and configured to actuate a force to support the charge device during the presence of the seam region in the nip location.

54. A method comprising:
   providing an imaging member having an outer surface comprising a plurality of portions having a plurality of different radii;
   rotating the portions of the outer surface of the imaging member adjacent to a charge device configured to provide an electrical charge to the imaging member, the charge device comprising only a single emitting structure for emitting an entirety of the energy which is used to charge the imaging member;
   first controlling a position of the charge device with respect to one of the portions of the outer surface of the imaging member using the one of the portions of the outer surface at one moment in time;
   second controlling a position of the charge device with respect to an other of the portions of the outer surface of the imaging member using a positioning control system at an other moment in time;
   using the charge device, providing the electrical charge to the one of the portions of the imaging member at the one moment in time; and
   detecting a defined portion of the imaging member approaching a defined position in space, and wherein the second controlling comprises activating the positioning control system responsive to the detecting.

55. An imaging method comprising:
   rotating an imaging member adjacent to a charge device to impart an electrical charge to an outer surface of the imaging member, the outer surface comprising a first region having a first radius different from a second radius of a second region of the outer surface;
   sensing whether the first region is approaching a location of the charge device; and
   separating the charge device from the imaging member when the first region approaching the location is sensed so that the electrical charge is substantially not imparted to the first region.

56. The method of claim 55 further comprising pressing the charge device against the imaging member to impart the electrical charge to the outer surface when the first region is not approaching the location.

57. The method of claim 55 wherein sensing whether the first region is approaching the location comprises sensing rotation of the imaging member.

58. The method of claim 55 wherein sensing whether the first region is approaching the location comprises sensing a rotational position of the imaging member.

59. The method of claim 55 wherein separating the charge device from the imaging member comprises activating an actuator to apply a force to the charge device to prevent the charge device from contacting the imaging member in the first region.

60. The method of claim 55 wherein the outer surface of the imaging member comprises a photoconductive sheet, and the seam region corresponds to a seam of the photoconductive sheet.

61. The method of claim 55 further comprising:
forming a latent image upon the outer surface of the imaging member; and
developing the latent image using a marking agent.

62. The method of claim 55 wherein the electrical charge comprises a blanket electrical charge imparted to the imaging member during imaging.

63. An image engine comprising:
an imaging member including an outer surface having first and second regions, the first region having a first radius different from a second radius of the second region;
a charge device to impart an electrical charge to the outer surface of the imaging member;
a sensor to detect whether the first region is approaching a location of the charge device; and
an actuator to separate the charge device from the imaging member when the sensor detects the first region is approaching the location of the charge device to prevent or limit the electrical charge from being imparted to the first region.

64. The image engine of claim 63 wherein the charge device comprises a single charge emitting structure to impart a blanket electrical charge to the imaging member during imaging.

65. The image engine of claim 63 wherein the charge device is to ride upon the imaging member.

66. The image engine of claim 63 further comprising a spring to press the charge device against the imaging member to impart the electrical charge to the outer surface when the first region is not approaching the location.

67. The image engine of claim 63 wherein the charge device is positioned relative to the imaging member to enable a gravitational force to press the charge device against the imaging member to impart the electrical charge to the outer surface when the first region is not approaching the location.

68. The image engine of claim 63 wherein the imaging member comprises a photoconductor drum.

69. The image engine of claim 63 further comprising:
a discharge device to electrically discharge selected portions of the electrical charge to form a latent image; and
a development station to develop the latent image of the imaging region using a liquid marking agent.

70. The image engine of claim 63 wherein the imaging member comprises a photoconductive sheet to form the outer surface, and the seam region corresponds to a seam of the photoconductive sheet.

\* \* \* \* \*

UNITED STATES PATENT AND TRADEMARK OFFICE
CERTIFICATE OF CORRECTION

| | |
|---|---|
| PATENT NO. | : 7,835,668 B2 |
| APPLICATION NO. | : 10/997033 |
| DATED | : November 16, 2010 |
| INVENTOR(S) | : Michael H. Lee et al. |

It is certified that error appears in the above-identified patent and that said Letters Patent is hereby corrected as shown below:

In column 9, line 56, in Claim 2, delete "the the second" and insert -- the second --, therefor.

In column 14, line 31, in Claim 54, after "single" insert -- charge --.

Signed and Sealed this
Twenty-ninth Day of March, 2011

David J. Kappos
*Director of the United States Patent and Trademark Office*